E. J. & E. M. LOCKHART.
FISH BAIT OR LURE.
APPLICATION FILED AUG. 27, 1909.
1,009,077.
Patented Nov. 21, 1911.
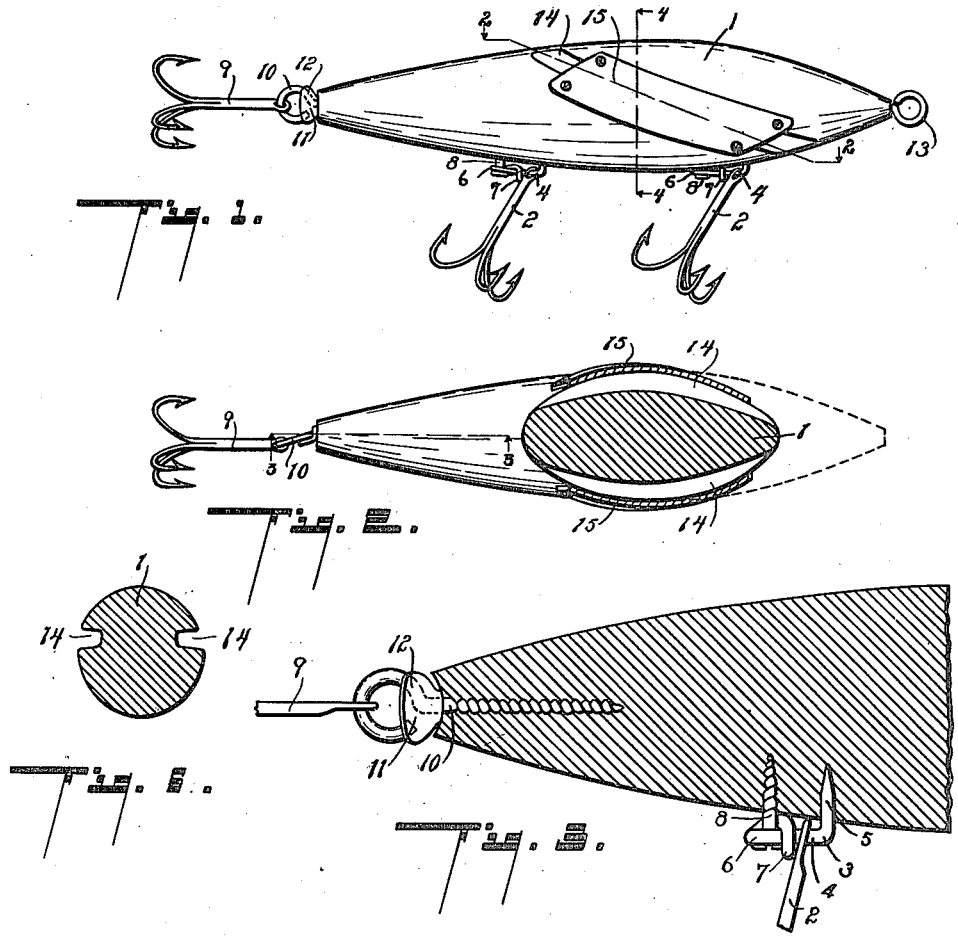
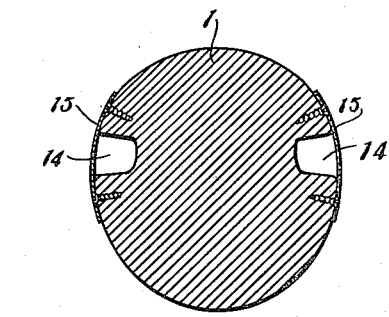
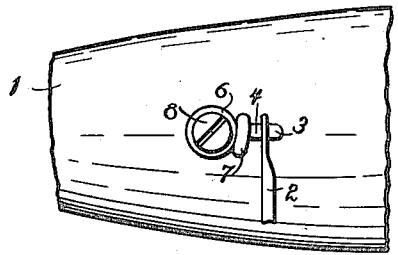

UNITED STATES PATENT OFFICE.

EDWARD J. LOCKHART AND EVELYN M. LOCKHART, OF GALESBURG, MICHIGAN.

FISH BAIT OR LURE.

1,009,077.  Specification of Letters Patent.  Patented Nov. 21, 1911.

Application filed August 27, 1909. Serial No. 514,892.

*To all whom it may concern:*

Be it known that we, EDWARD J. LOCKHART and EVELYN M. LOCKHART, citizens of the United States, residing in the village of Galesburg, county of Kalamazoo, State of Michigan, have invented certain new and useful Improvements in Fish Bait or Lure, of which the following is a specification.

This invention relates to improvements in fish bait or lure.

Our present invention is a modification and in some respects an improvement upon the structure shown in Patent No. 923,670, issued June 2, 1909, Edward J. Lockhart one of the applicants.

The main objects of this invention are: First to provide an improved fish bait or lure which has when drawn through the water a movement somewhat resembling that of a minnow. Second, to provide an improved fish bait or lure which is adapted to run under the surface of the water when in use, and, at the same time, which will readily float. Third, to provide in a fish bait or lure improved means for attaching the hooks.

Further objects, and objects relating to structural details will definitely appear from the detailed description to follow.

We accomplish the objects of our invention by the devices and means described in the following specification. The structure described constitutes one effective embodiment of our invention.

Other embodiments would be readily devised by those skilled in the art.

The invention is clearly defined and pointed out in the claims.

A structure constituting an effective and preferred embodiment of the features of our invention is clearly illustrated in the accompanying drawing, forming a part of this specification in which:

Figure 1 is a side elevation of a structure embodying the features of our invention. Fig. 2 is a section taken diagonally through the body on a line corresponding to line 2—2 of Fig. 1, the forward end of the body being shown in outline by dotted lines. Fig. 3 is an enlarged detail longitudinal section taken on a line corresponding to line 3—3 of Fig. 2, showing details as the means for attaching the hook. Fig. 4 is an enlarged cross section taken on a line corresponding to line 4—4 of Fig. 1. Fig. 5 is a detail inverted plan with the hook turned to one side to show details of the hook fastener. Fig. 6 is a cross section corresponding to that of Fig. 4 of a modified construction in which the closing plate for the channel-like grooves or passages are omitted thereby providing open passages or channels in the sides of the body.

In the drawing, similar reference characters refer to similar parts throughout the several views and the sectional views are taken looking in the direction of the little arrows at the ends of the section lines.

Referring to the drawing; the body 1 of our improved fish bait or lure is preferably tapered toward each end as is illustrated. The hooks 2 are provided with securing means preferably consisting of the members 3 having shank portions 4 adapted to receive the hooks with body engaging brads 5 at one end and eyes 6 at the other end. These attaching members 3 are preferably formed of wire, one end of the wire being formed into the brad 5 and the other end being coiled to form the eye 6 and wrapped around the shank portion in front of the eye to form the hook support 7. This hook support engages the shank of the hook as is illustrated in Fig. 1 and limits the swinging movement of the hook thereby, preventing its swinging against the under side of the body so that it is held in an extended position below the body to receive the strike of the fish. The screw 8 is arranged through the eye 6 for attaching the member of the body, the brad 5 coacting therewith. The trailer hook 9 is preferably attached by means of the open screw eye 10, the opening 11 of the screw eye being of sufficient size to permit the ready engagement or disengagement of the hook therewith. This opening is guarded by the plate 12 which is secured by arranging the screw there-through as illustrated. This forms a simple and effective means for supporting the rear or trailing hook. At the forward end of the body is a screw eye 13 for the attachment of the line.

The body is provided with upwardly and rearwardly extending passages 14. These passages are preferably formed by grooving the sides of the body and covering the central portions of the grooves with the plates 15 thus forming passages open at each end. These passages are preferably oppositely disposed as illustrated. In the modified construction the passages are open from end to end which modification we find quite satisfactory in use. In use when the base is drawn through the water the water engaging in the passages causes the bait to dive downwardly and underneath the surface of the water and as they are arranged in the sides they serve to hold the body in an upright position, at the same time imparting a wiggling or rocking movement thereto. Further the water passing through these passages serves to agitate the surrounding water thereby further attracting attention of the fish. The plates may be of bright metal or have a bright finish if desired and thus add to the attractiveness of the bait; also the grooves may be finished in a distinguishing color and further add to the attractiveness of the bait.

We have illustrated and described our improved bait in detail in the form in which we find desirable and effective. We are, aware, however, that it is capable of considerable variation in structural details and a desirable bait may still be secured without departing from our invention.

Having thus described our invention, what we claim as new and desire to secure by Letters Patent is:

1. A fish bait or lure comprising a body having oppositely disposed upwardly and rearwardly extending grooves in the sides thereof, said grooves being provided with covering plates arranged to form open ended passages.

2. A fish bait or lure comprising a body having upwardly and rearwardly extending grooves in the sides thereof, said grooves being provided with covering plates arranged to form open ended passages.

3. A fish bait or lure comprising a body having oppositely-disposed oblique grooved passages extending upwardly and rearwardly therethrough at each side.

In witness whereof, we have hereunto set our hands and seals in the presence of two witnesses.

EDWARD J. LOCKHART. [L. S.]
EVELYN M. LOCKHART. [L. S.]

Witnesses:
FRANK P. MUHLENBERG,
E. ALFRED SHEWELL.